March 9, 1954
C. R. CURNUTT
2,671,894
CONTROL AND MONITORING DEVICE
Filed Aug. 6, 1951
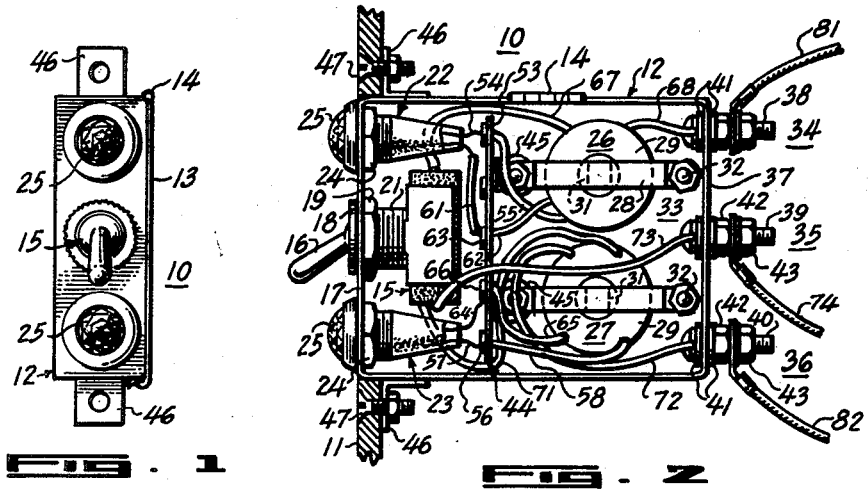
INVENTOR:
Clarvel R. Curnutt
BY
ATTORNEY Patented Mar. 9, 1954

2,671,894

UNITED STATES PATENT OFFICE 2,671,894

CONTROL AND MONITORING DEVICE

Clarvel R. Curnutt, Fort Worth, Tex., assignor to Consolidated Vultee Aircraft Corporation, San Diego, Calif., a corporation of Delaware Application August 6, 1951, Serial No. 240,573

4 Claims. (Cl. 340—252)

1

This invention relates to electric circuit controlling devices and more particularly to control devices of novel construction for use in electrical circuits for controlling and indicating alternating current flow therethrough.

An object of the present invention is to provide an improved electrical warning means for simultaneously controlling and monitoring the flow of current through a circuit to a load device.

Another object of the invention is to provide an improved form of indicating means for determining the electrical condition of a remotely located load device.

Another object of the invention is the provision of a novel current-flow control and indicating device particularly adapted for use on an instrument panel wherein it produces a visual signal to indicate to the operator the condition of an electric circuit.

Another object of the invention resides in providing an electric circuit condition indicator of improved and novel construction embodying transformer means for operating signalling lights.

A further object of the invention lies in the provision of a novel visual signalling device for use in electrical circuits utilizing electric currents of small values, which currents are normally too weak to operate an indicating bulb.

A further object of the invention is to provide a novel current-flow control and signalling means which controls and affords a visual indication of the operating condition of devices of both intermittent and constant load types.

A still further object of this invention is the provision of an improved and simplified current-flow control and signalling device for use with remotely located loads which does not necessitate the use of relays, complicated wiring, or extraneous sources of current supply.

A still further object of the invention is to provide a current-flow control and circuit condition indicator which is of simplified and compact construction, neat in appearance, and inexpensive to manufacture.

Other objects and features of this invention will be readily apparent to those skilled in the art from the following specification and appended drawing illustrating certain preferred embodiments of this invention in which:

Figure 1 is a front elevation of an electric circuit controlling and monitoring device in accordance with the present invention.

Figure 2 is a side elevational view of the device of Figure 1, with its cover open, and with the device mounted in operative position on an instrument panel.

Figure 3 is a circuit diagram showing the device in association with in intermittent load device.

Figure 4 is a circuit diagram illustrating the use of the device with a constant load device; and Figure 5 is a circuit diagram showing a modification of the electric circuit controlling and monitoring device.

Having reference now, in greater detail, to the drawing, wherein like parts are designated by like numerals throughout the specification and drawing, the electric circuit controlling and monitoring device of the present invention is designated generally therein by the numeral 10. Figure 2 illustrates device 10 as installed in operative position on an instrument panel 11, arranged to be viewable on the front face thereof and to be readily accessible to an operator. Since the present invention has particular application when used in aircraft, it will be assumed that instrument panel 11 is located in the pilot compartment of an aircraft, but without implication that the invention cannot be employed in other locations of similar environment and having similar problems.

Control device 10 comprises a generally rectangular housing or box 12, openable at one end, with a closing cover 13 hingedly mounted as at 14 on one edge of the housing 12. Supported within housing 12 is a usual three-position control switch 15 with an actuating lever 16. The switch 15 is fixedly mounted upon the front wall 17 of housing 12 by a pair of lock-nuts 18 and 19 cooperating with a cylindrical, exteriorly threaded, mounting portion 21 provided by the switch 15.

A pair of signal lamps or indicator lights 22 and 23 are located on housing wall 17, being fixedly secured thereto, on either side of actuating lever 16, by mounting nuts 24. The signal lamps 22 and 23 are preferably of the glow type, for a reason to be hereinafter discussed. Signal lamps 22 and 23 embody faceted, jewel-type, lens 25, which may be colored for the convenience of and more ready observation by the operator.

Also disposed within housing 12 are a pair of step-up transformers 26 and 27, each comprising a generally E-shape magnetic core 28 and coil windings 29 fitted about the central leg 31 of core 28. A plurality of nut and bolt assemblies 32 secure the transformers 26 and 27 to the base 33 of housing 12.

Three terminals 34, 35, and 36 are mounted upon end wall 37 of housing 12, these terminals comprising, respectively, binding posts 38, 39 and 40, headed at their ends and threaded at their outer ends. Suitable insulating washers 41 are provided on each of the posts at either side of wall 37 to insulate their posts from housing 12. Binding nuts 42 and 43 are fitted upon the threaded outer ends of each post for the connection of conductors thereto. Terminals 34 and 36 are adapted to accommodate the lead wires of a load device to be serviced, while terminal 35 serves as a current supply terminal, as will be hereinafter further discussed.

A terminal strip 44 is located within housing 12, spaced from the front wall 17 to lie between the pair of transformers 26 and 27 and the elements carried by the front wall 17. Terminal strip 44 embodies mounting flanges 45 which cooperate with a pair of the transformer nut and bolt assemblies 32 to fixedly mount terminal strip 44 upon housing base 33.

A pair of mounting brackets 46 are provided upon the exterior of housing 12, on opposite walls thereof. Nut and bolt assemblies 47 secure the brackets 46 to instrument panel 11 to mount the control device 10 in the required position thereon opposite an opening in the panel so that the lamps 22 and 23 will be visible and actuating lever 16 will be accessible at the front of the panel for manual operation of switch 15 for a purpose to be described.

As shown in Figure 3, windings 29 of transformer 26 include a primary coil 48 and a secondary coil 49, and windings 29 of transformer 27 embody a primary coil 51 and a secondary coil 52.

Indicator light 22 and one end of secondary coil 49 of transformer 26 are connected, as by soldering, to a common terminal 53 provided on the terminal strip 44 by conductors 54 and 55, while the other indicator light 23 and one end of the secondary coil 52 of the second transformer 27 are similarly connected to a second common terminal 56 by conductors 57 and 58. Leads 61 and 62 connect, respectively, the indicator light 22 and the other end of secondary coil 49 of transformer 26 to a common grounded terminal 63 carried by terminal strip 44. A second pair of leads 64 and 65 connect, respectively, the indicator light 23 and the opposite end of secondary coil 52 of transformer 27 to a second common grounded terminal 66 afforded by terminal strip 44.

One end of primary coil 48 of transformer 26 is connected by a conductor 67 to the control switch 15 while its opposite end is connected by a lead 68 to binding post 34. The primary coil 51 of transformer 27 is similarly connected, with a lead 71 connecting one end of primary coil 51 to switch 15 and with a second lead 72 connecting the opposite end thereof to binding post 36. A lead 73 extends from control switch 15 to current supply terminal 35, and a second lead 74 connects this terminal 35 to a suitable source of power, such as alternating current generator 75, illustrated in Figure 3.

Figure 3 illustrates a circuit wherein the control device 10 is shown employed for the control and intermittent operation of a reversible motor, which is indicated generally by the numeral 76. It is understood that reversible motor 76 is merely illustrative of a load device that may be used with the present indicator switch 10, and that no limitation is to be implied in citing the reversible motor as an example.

As shown in the drawing, the reversible motor 76 includes in its circuit a pair of usual limit switches 77 and 78 which serve to determine the amount of rotation of the motor in opposite directions. Suitable mechanical connections, indicated generally at 79, are provided between motor 76 and its associated limit switches 77 and 78 so that when the motor 76 has rotated in one direction a sufficient amount to perform a desired operation a limit switch will be actuated through the mechanical interconnection therewith to break the motor circuit and stop the motor. On rotation of the motor in the opposite direction the extent of movement is determined by the opposite limit switch, which functions in like manner as the first to break the motor circuit and thereby bring the motor to rest. The particular type or the particular mechanism employed to effect the desired operation of the limit switches forms no part of the present invention and therefore no detailed description thereof is necessary.

As shown in Figure 3, indicator switch is coupled to motor 76 by lead wires 81 and 82 which, respectively, connect load terminals 34 and 36 to the circuit of limit switches 77 and 78 whereby current may be supplied to the motor 76 from power source 75 through indicator switch 10.

With indicator switch 10 connected to motor 76 the latter may be rotated in either of its directions of movement dependent upon the manual operation of actuating lever 16 of control switch 15. Motor 76 cannot operate until control switch 15 is actuated to complete the circuit from the power source 75.

Assuming lever 16 is moved from its neutral position to close the circuit through the primary coil 48 of transformer 26 current will then be fed through serially connected limit switch 77 to the motor 76 to permit rotation thereof until it has performed a desired operation and limit switch 77 is operated to break the circuit. With current flowing through primary coil 48 a current will be induced in secondary coil 49 sufficient to operate glow lamp 22. Lamp 22 will continue to provide a visual signal to the operator that current is flowing to motor 76 until the motor 76 completes a required operation at which time limit switch 77 breaks the circuit of primary coil 48. When lamp 22 ceases to glow the operator is thereby informed that the motor 76 has completed its operation. Now if it is desired to reverse the motor 76 to return it, and such apparatus as may be controlled by it, to their original condition lever 16 will be moved to close the circuit of primary coil 51 of transformer 27 thereby to feed current from power source 75 to induce voltage in secondary 52 to ignite lamp 23 and to pass current through serially connected limit switch 78 to motor 76, causing the latter to rotate in the reversed direction until limit switch 78 is operated to cut off current flow to motor 76. The completion of this latter operation is made known to the operator, but in this instance, by reason of the lamp 23 ceasing to glow.

In practice, as is well understood to those skilled in the art, the current provided in aircraft for effecting the operation of various of its accessory actuating motors to effect operation of various accessories, control members, constant load members, such as heaters, etc. is necessarily small. This usual current is of such a small magnitude that without employing devices such as transformers 26 and 27, as in the present invention, signalling lamps will not operate. In the present invention transformers 26 and 27 are employed to produce a secondary voltage sufficient to operate glow type of indicating bulbs. The ratio of turns between the primary and secondary turns of the transformers 26 and 27 is such that for very small primary currents sufficient secondary voltage is obtained that a glow can operate. It is merely a matter of experience to determine the proper size of transformer.

A glow type of bulb, that is, a bulb comprising an enclosing vessel having therein an ionizable atmosphere, is preferred for use in the present invention, since it is dependent for operation on voltage strength rather than current strength, and the required voltage strength is readily obtainable with the use of a step-up transformer. Further, if secondary voltage should be increased to a relatively high value on increase of the primary current, occasioned by the occurrence of a short-circuit or other current increasing conditions in the line, a glow type tube will not burn out as would a constant voltage incandescent type of bulb.

From the above description, it is readily apparent that control device 10 of the present invention affords a simple, inexpensive, and highly reliable means for controlling and simultaneously monitoring the operation of intermittent load devices. These dual functions are here accomplished without requirement of complicated wiring, or extraneous electrical devices, in association with the controlled load or without requiring any special adaptations of the device being controlled.

The invention has been above described in conjunction with an intermittent load device, however, it is here specifically noted that control and monitoring device 10 is as readily adapted for use with constant load type devices such as heaters or motors required to run continuously. Figure 4 illustrates a circuit wherein a heater 85 of conventional design, is to be serviced by control device 10. As shown, the heater 85 is connected by a lead 86 to load terminal 34 and therethrough to the primary coil 48 of transformer 26 (though it could as readily be connected to load terminal 36 and to the primary coil 51 of transformer 27). With lever 16 moved to close the circuit from the power supply 75 current will flow through primary coil 48, inducing a voltage in secondary coil 49 to operate lamp 22, and placing heater 85 into operation. Lamp 22 will continue to glow so long as power continues to be supplied to heater 85. If lamp 22 fails to glow or should go out, the operator will be informed that a defect exists in the heater circuit. A motor adapted to be run constantly could be substituted for heater 85, being connected in similar manner to either the primary coil 48 of transformer 26 or the primary coil 51 of transformer 27 since but one circuit need be maintained to the load device, and failure of lamp 22 to operate or a cessation of glow will provide an indication to the operator that trouble exists in the motor circuit.

Figure 5 illustrates, diagrammatically, a modification of the invention wherein but one transformer is utilized and which is indicated at 91. The modification, as a unit, is identified by the numeral 10a. In this modification a conventional double-pole, double-throw type of switch, indicated generally by numeral 92, is substituted for switch 15 of the preferred embodiment. Glow lamp 22 is connected by appropriate conductors to a contact 93 of switch 92 and to ground. Transformer 91 includes a primary coil 94, a core 95, and a secondary coil 96, with primary coil 94 being connected to a terminal 97 of switch 92 and to the current supply treminal 35, and with secondary coil 96 being connected to a terminal 98 of switch 92 and to ground. Glow lamp 23 is connected to a contact 99 of switch 92 and to ground. Leads 101 and 102 connect contacts 103 and 104 of switch 92, respectively, to load terminals 34 and 36. An actuating lever 105 is provided for closing the circuit to either the load terminal 34 or the load terminal 36.

The modification of Figure 5 is shown in use with a constant load device, which, for example, is a reversible motor required to run constantly in either clockwise or counter-clockwise direction, and responding to changes in polarity of current fed thereto. This motor is indicated in the drawings generally by the numeral 106, and is shown connected to load terminals 34 and 36 of control device 10a by conductors 107 and 108. To start the motor 106 lever 105 is manually operated to place the contacts 93 and 103 in circuit. This operation permits current to flow from power supply 75 through primary coil 94 to contact 103 and therefrom to load terminal 34 and thence to motor 106 to actuate the latter. The current flowing through primary coil 94 induces a voltage in the secondary coil 96 which, because of the proper selection of primary and secondary winding turns, will be sufficient to operate glow lamp 22. So long as lamp 22 continues to glow a visual indication is provided the operator of the rotation of the motor 106. To stop the motor 106 the lever 105 is moved to its neutral position to stop the flow of current to the motor. If it is then desired to rotate the motor in the opposite direction lever 105 is moved to throw contacts 99 and 104 into circuit to connect the lamp 23 into circuit with the secondary coil 96 and to pass current through load terminal 36 to motor 106. Again motor 106 continues to operate and lamp 23 to glow until the lever 105 is returned to neutral or a defect occurs in the motor circuit.

From the above description afforded of the preferred and the modified embodiments of the invention, it is thought that the construction and operation of the invention will be fully understood, and no further explanation is required.

While certain preferred embodiments of the invention have been specifically disclosed it is understood that the invention is not limited thereto as many variations will be readily apparent to those skilled in the art and the invention is to be given its broadest possible interpretation within the terms of the following claims.

What I claim is:

1. In a warning system for a remotely located current actuated load having an electrical circuit and a source of alternating electrical current, control means including an electric switch means for effecting a connection between said electrical circuit and said source of alternating electrical current, a pair of visual signal means electrically connected to said switch means and each having a connection to ground, and a single transformer, said transformer having a primary coil serially connected to said switch means and said source of alternating electrical current and a secondary coil interconnected between ground and said switch means, said primary coil inducing a voltage in said secondary coil to operate a visual signal means on operation of said switch means to permit current flow to said electrical circuit, said visual signal means serving to monitor the flow of current to said electrical circuit.

2. In a warning system for a remotely located current actuated load having an electrical circuit and a source of alternating electrical current, control means including a double-pole, double-throw switch for effecting a connection between said electrical circuit and said source of alternating electrical current, a pair of visual signal means and a single transformer, a pair of conductors connecting said switch to said electrical circuit, conductors connecting said pair of visual signal means to said switch and to ground, said transformer having a primary coil and a secondary coil, conductor means connecting said primary coil to said switch and to said source of alternating electrical current, and conductor means connecting said secondary coil between ground and said switch, said primary coil inducing a voltage in said secondary coil to operate a visual signal means on operation of said switch means to an ON position to pass current to said electrical circuit, said visual signal means serving to monitor the flow of current to said electrical circuit.

3. In a warning system for a reversible motor having an electrical circuit and a source of alternating electrical current, control means including a double-pole, double-throw switch for effecting a connection between said electrical circuit and said source of alternating electrical current to control the direction of rotation of said reversible motor, a pair of glow lamps and a single transformer, a pair of conductors connecting said switch to said electrical circuit, conductors connecting said pair of glow lamps to said switch and to ground, said transformer having a primary coil and a secondary coil, conductor means connecting said primary coil to said switch and to said source of alternating electrical current, and conductor means connecting said secondary coil between ground and said switch, said primary coil inducing a voltage in said secondary coil to operate a glow lamp on operation of said switch means to an ON position to pass current to said electrical circuit to effect rotation of said reversible motor, said glow lamp serving to monitor the flow of current to said electrical circuit.

4. A circuit controlling and monitoring device for a current actuated load means having an electrical circuit, comprising a double pole, double-throw switch for effecting a connection between said electrical circuit and a source of current, a pair of visual signal means electrically connected to said switch, a transformer having a primary coil and a secondary coil, conductor means connecting said primary coil to said switch and said source of current, and conductor means connecting said secondary coil between ground and said switch, said switch including an actuating lever for selectively connecting said visual signal means in circuit with said secondary coil, said primary coil inducing a voltage in said secondary coil to operate a visual signal means on operation of said switch to an ON position to pass current to said electrical circuit.

CLARVEL R. CURNUTT.

References Cited in the file of this patent

UNITED STATES PATENTS

| Number | Name | Date |
|---|---|---|
| 671,273 | Hewlett | Apr. 2, 1901 |
| 831,404 | Ball | Sept. 18, 1906 |
| 1,209,407 | Donahue | Dec. 19, 1916 |
| 2,037,565 | Dozler | Apr. 14, 1936 |
| 2,127,893 | Webster | Aug. 23, 1938 |
| 2,248,351 | Hughes et al. | July 8, 1941 |

FOREIGN PATENTS

| Number | Country | Date |
|---|---|---|
| 582,038 | Great Britain | Nov. 1, 1946 |